US010449562B2

(12) United States Patent
Kah, Jr.

(10) Patent No.: US 10,449,562 B2
(45) Date of Patent: Oct. 22, 2019

(54) ADJUSTABLE ARC OF COVERAGE CONE NOZZLE ROTARY STREAM SPRINKLER

(71) Applicant: Carl L. C. Kah, Jr., North Palm Beach, FL (US)

(72) Inventor: Carl L. C. Kah, Jr., North Palm Beach, FL (US)

(*) Notice: Subject to any disclaimer, the term of this patent is extended or adjusted under 35 U.S.C. 154(b) by 0 days.

(21) Appl. No.: 14/979,099

(22) Filed: Dec. 22, 2015

(65) Prior Publication Data

US 2016/0107177 A1 Apr. 21, 2016

Related U.S. Application Data

(62) Division of application No. 14/293,750, filed on Jun. 2, 2014.

(Continued)

(51) Int. Cl.
*B05B 3/04* (2006.01)
*A01G 25/00* (2006.01)
(Continued)

(52) U.S. Cl.
CPC ............ *B05B 3/0486* (2013.01); *A01G 25/00* (2013.01); *B05B 1/304* (2013.01); *B05B 3/005* (2013.01);
(Continued)

(58) Field of Classification Search
CPC ......... B05B 3/005; B05B 3/021; B05B 1/304; B05B 3/0486; B05B 15/10; B05B 15/70; B05B 15/74; A01G 25/00
See application file for complete search history.

(56) References Cited

U.S. PATENT DOCUMENTS 2,501,910 A   3/1950 Oughton
6,145,758 A * 11/2000 Ogi .................... B05B 1/262
                                                      239/457

(Continued)

FOREIGN PATENT DOCUMENTS

EP    1944090    7/2008
EP    2255884   12/2010
WO  2014018892    1/2014

OTHER PUBLICATIONS

International Search Report and Written Opinion dated Jun. 30, 2015 issued in related PCT International Application No. PCT/US15/18903.

(Continued)

*Primary Examiner* — Arthur O. Hall
*Assistant Examiner* — Steven M Cernoch
(74) *Attorney, Agent, or Firm* — Amster, Rothstein & Ebenstein LLP

(57) ABSTRACT

A cone valve assembly including an upper valve member with a conical top portion and a stepped and spiraled top surface and a lower valve member including a central opening with a stepped and spiraled valve surface surrounding the central opening. The upper valve member is mounted in the lower valve member such that the lower valve member is rotatable and axially movable relative to the upper valve member. Rotation of the lower valve member allows for the adjustment of an arcuate slot opening that provides a conically shaped discharge stream of water from the cone valve nozzle assembly directly onto the rotating distributor to provide the desired arc of sprinkler coverage.

5 Claims, 8 Drawing Sheets

Related U.S. Application Data

(60) Provisional application No. 61/829,776, filed on May 31, 2013.

(51) Int. Cl.
*B05B 15/70* (2018.01)
*B05B 3/00* (2006.01)
*B05B 3/02* (2006.01)
*B05B 1/30* (2006.01)
*B05B 15/74* (2018.01)

(52) U.S. Cl.
CPC .............. *B05B 3/021* (2013.01); *B05B 15/70* (2018.02); *B05B 15/74* (2018.02)

(56) References Cited

U.S. PATENT DOCUMENTS

| | | | |
|---|---|---|---|
| 6,443,372 B1 * | 9/2002 | Hsu | B05B 1/262 239/457 |
| 6,736,332 B2 | 5/2004 | Sesser et al. | |
| 6,997,393 B1 | 2/2006 | Angold et al. | |
| 7,032,836 B2 | 4/2006 | Sesser et al. | |
| 7,159,795 B2 | 1/2007 | Sesser et al. | |
| 7,611,077 B2 | 11/2009 | Sesser et al. | |
| 8,074,897 B2 | 12/2011 | Hunnicutt et al. | |
| 8,789,768 B2 | 7/2014 | Hunnicutt et al. | |
| D724,696 S * | 3/2015 | Barmoav | D23/214 |
| 8,991,726 B2 | 3/2015 | Kah et al. | |
| 2002/0139868 A1 | 10/2002 | Sesser | |
| 2002/0166900 A1 | 11/2002 | Sesser et al. | |
| 2004/0050955 A1 | 3/2004 | Sesser et al. | |
| 2004/0227007 A1 | 11/2004 | Sesser et al. | |
| 2008/0257982 A1 | 10/2008 | Kah et al. | |
| 2009/0173803 A1 | 7/2009 | Kah et al. | |
| 2010/0090024 A1 | 4/2010 | Hunnicutt et al. | |
| 2010/0301135 A1 | 12/2010 | Hunnicutt et al. | |
| 2013/0334332 A1 | 12/2013 | Robertson et al. | |
| 2013/0334340 A1 | 12/2013 | Walker et al. | |
| 2014/0027526 A1 | 1/2014 | Shadbolt et al. | |
| 2014/0027527 A1 | 1/2014 | Walker | |

OTHER PUBLICATIONS

European Search Report and Written Opinion dated Written Opinion dated Jul. 3, 2018 issued in corresponding European Application No. 15850767.3-1010.

European Search Report and Written Opinion dated Written Opinion dated Jul. 20, 2018 issued in corresponding European Application No. 15850767.3-1010.

* cited by examiner

ADJUSTABLE ARC OF COVERAGE CONE NOZZLE ROTARY STREAM SPRINKLER

CROSS-REFERENCE TO RELATED APPLICATIONS

The present application is a divisional application of U.S. patent application Ser. No. 14/293,750, entitled ADJUSTABLE ARC OF COVERAGE CONE NOZZLE ROTARY STREAM, filed Jun. 2, 2014, which claims benefit of and priority to U.S. Provisional Patent Application Ser. No. 61/829,776, entitled ADJUSTABLE ARC OF COVERAGE CONE NOZZLE FOR STREAM ROTARY SPRINKLER, filed May 31, 2013, the entire content of which is hereby incorporated by reference herein.

BACKGROUND

Field of the Disclosure

The present invention relates to a cone nozzle assembly for use in a rotary nozzle sprinkler as well as a stepped and spiraled matching upper and lower adjustable length arcuate slot nozzle for discharging water directly upwardly onto a rotating self driven and channeled distributor in combination with improved nozzle housing assemblies including a throttling valve, arc of coverage setting and secondary pop-up of the rotating distributor out of the nozzle housing assembly.

Related Art

Generally, conventional rotary stream sprinklers do not allow for arc of coverage adjustment of more that 120 degrees, or perhaps 180 degrees, in a single nozzle assembly. Some rotary stream nozzle sprinklers that allow for partial arc adjustment require the use of a "deflector" positioned down stream of the partially adjustable arc set nozzle in order to direct the flow of water further outward from the center prior to striking the rotating channeled distributor to prevent it from striking the sealed rotating joint on the support shaft of the rotating distributor which is filled with viscous damping fluid. When a stream of water strikes the deflector downstream of the nozzle, it tends to spread, thus requiring interaction between the end of the rib used to form the channels of the distributor and the deflector such as that described in U.S. Pat. No. 6,651,905 and reducing uniformity of flow around larger arcuate openings. This results in distortions in the watering pattern A sprinkler head in accordance with an embodiment of the present disclosure includes a base, a conical adjustable nozzle defining an adjustable arcuate discharge orifice, a rotating distributor supported on a shaft extending upwardly from said base, and adapted to be impinged by a stream emitted from the nozzle and an arc adjustment ring rotatably mounted on said base, said arc adjustment ring operatively connectable with said nozzle to adjust said arcuate discharge orifice.

Accordingly, it would be beneficial to provide a nozzle assembly for use in a rotary stream nozzle sprinkler and rotary nozzle sprinkler that avoids these and other problems.

SUMMARY

It is an object of the present disclosure to provide an adjustable, preferably an essentially fully adjustable, arc of coverage arcuate slot nozzle assembly that discharges water directly onto the rotating distributor that provides for improved uniformity throughout the settable arc of coverage and allows for upstream special pattern setting and better flow with less stream turbulence in the discharge of water onto the rotating distributor for greater range and uniformity of the stream fall out pattern. Typically, more nozzle stream turbulence causes more turbulence velocity and results in smaller drop size and the break-up of larger range streams. This limits performance of the rotary stream sprinkler uniformity in distribution, i.e. pattern performance. In accordance with the present disclosure, these problems are avoided by providing a fully arc settable nozzle configured by interaction between upper and lower stepped and spiraled cone surfaces at a high angle of discharge to discharge water directly onto the channeled rotating distributor. This configuration provides a cone shaped, cylindrical discharge sheet or stream of water that strikes the rotating distributor and fills into the channels thereof at a location where the circumference of the distributor is sufficient to completely capture the stream. That is, the depth and width of the channels at that circumference is sufficient to accommodate the flow rate through the adjustable arcuate slot. The distance that the rotating distributor is positioned above the arcuate adjustable slot relates to the best discharge angle as well as the slot width, which determines the flow rate per unit of circumference and sprinkler precipitation rate.

It is an object of the present disclosure to provide a simple and easy to manufacture cone nozzle assembly that includes a small diameter upper valve member and a lower concentric valve member in which the upper member is mounted. The upper valve member includes an upper portion with a conical top portion having a stepped and spiraled underside valve surface and with a cone angle selected to be optimum for discharging a sheet of water onto the under side of a multiple channel rotating distributor which distributes water outwardly from the sprinkler. A matching stepped and spiraled concentric top valve surface is preferably provided in the lower valve member, which is selectively rotated and movable axially around a center of rotation. The cone nozzle assembly provides an adjustable length nozzle slot or opening for selecting an arc of coverage and discharging an outwardly coned thin sheet of water onto the multiple channel rotating distributor, which is rotatably mounted above the nozzle assembly.

An advantage of the cone nozzle assembly of the present disclosure is that because its apex inlet end has a minimum diameter, it allows for maximum slot width, which reduces clogging at low flow rates. Also, the valve member has a concentric support shaft that protrudes downwardly through alignment ribs at the cone nozzle inlet end to provide for selective flow restriction, if desirable, for pattern tailoring and for continuous concentric alignment of the upper and lower cone valve members during the opening and closing of the arcuate slot or opening around the circumference of the interacting stepped and spiraled portions of the valve members.

A nozzle assembly in accordance with an embodiment of the present application includes an upper valve member including a conical top portion with an upper stepped and spiraled underside valve surface and a lower valve member including a central opening and a lower stepped and spiraled top valve surface surrounding the central opening, the upper valve member mounted in the lower valve member such that the lower valve member is movable relative to the upper valve member such that interaction between the upper stepped and spiraled underside valve surface of the upper valve member and the lower stepped and spiraled top valve surface of the lower valve member defines an arcuate slot of a desired length to provide a conically shaped water discharge stream over a desired arc of coverage when water flows through the valve assembly.

A sprinkler head nozzle assembly in accordance with an embodiment of the present disclosure includes a nozzle housing including an inlet for pressurized water and an outlet downstream of the inlet, a rotating arc adjustment ring mounted on the nozzle housing such that rotation of the arc adjustment ring extends and reduces an arcuate exit opening to set an arc of coverage of the sprinkler head nozzle assembly, a rotating range adjustment ring mounted on the housing upstream of the arc adjustment ring such that rotation of the range adjustment ring increases and decreases a downstream flow area to control flow of water to the arcuate exit opening; and a rotating distributor, mounted on a central shaft extending through an arcuate adjustable nozzle including a valve assembly positioned below the rotating distributor in the nozzle housing and operable to direct water onto the rotating distributor. The valve assembly includes an upper valve element including a top portion with a conical stepped and spiraled underside valve surface and a lower valve member including a central opening and an upper stepped and spiraled top valve surface surrounding the central opening, the upper valve member mounted in the lower valve member such that the lower valve member is movable relative to the upper valve member such that interaction between the upper stepped and spiraled underside valve surface of the upper valve member and the lower stepped and spiraled top valve surface of the lower valve member defines the arcuate exit opening to provide a conically shaped water discharge stream over a desired arc of coverage when water flows through the valve assembly.

Other features and advantages of the present invention will become apparent from the following description of the invention, which refers to the accompanying drawings.

DETAILED DESCRIPTION OF THE EMBODIMENTS

Figure 6:
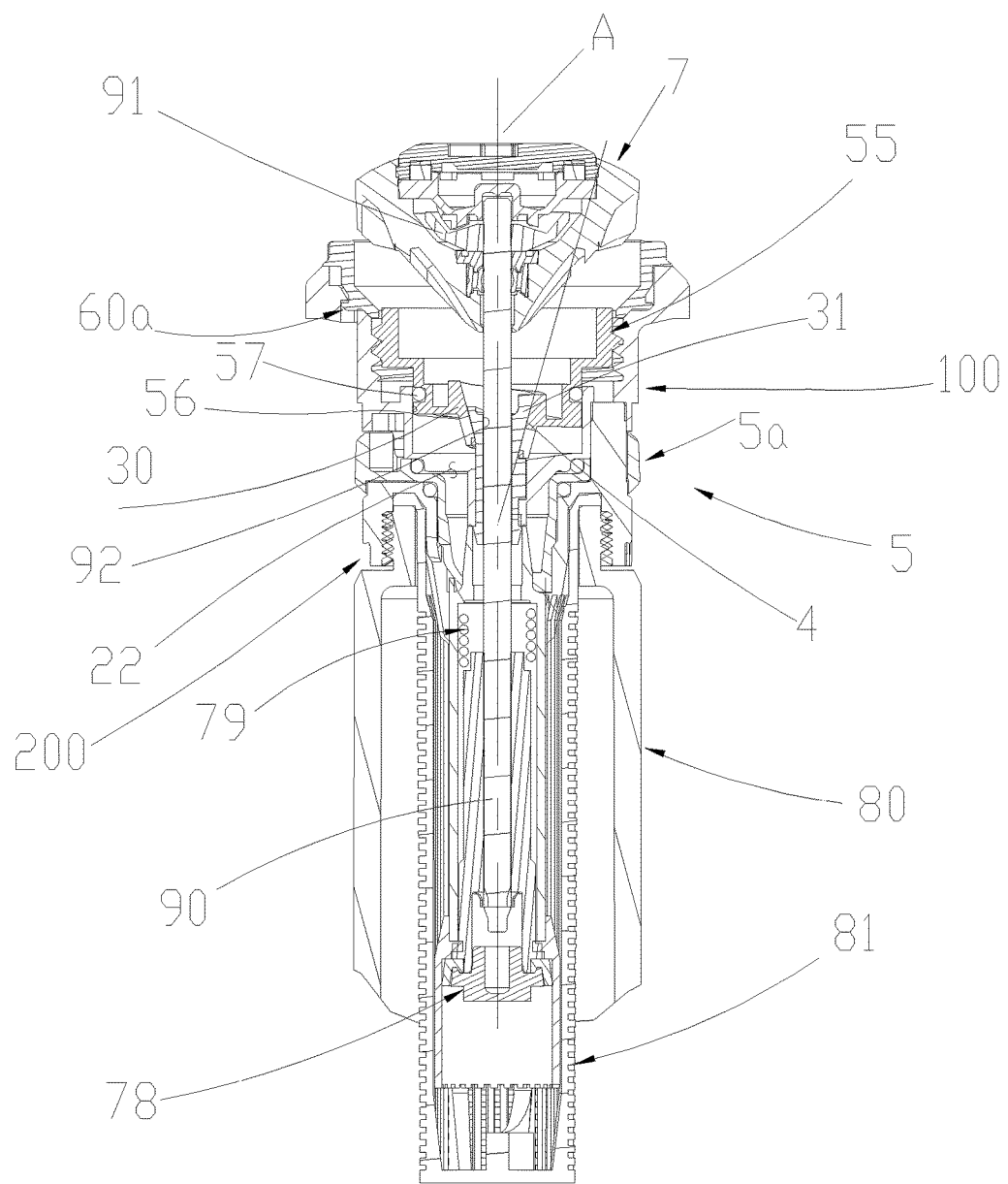
FIG. 6 shows a cross-sectional elevation view of the rotary nozzle sprinkler assembly complete with a pressure actuated lower piston and retraction spring compressed and the rotating distributor extended out of its nozzle housing in its operating position.

U.S. patent application Ser. No. 12/348,864 filed Jan. 5, 2009 entitled ARC AND RANGE OF COVERAGE ADJUSTABLE STREAM ROTOR SPRINKLER provides a description of the general configuration and operation of a rotary stream nozzle sprinkler and is incorporated by reference herein in its entirety. Some of the problems implicit in the operation of conventional rotary stream sprinklers are discussed above The cone valve nozzle assembly 3 of the present disclosure may be configured to be incorporated into the above-referenced stream rotor sprinkler configuration and is preferably provided in nozzle housing assembly 5, which may be attached to the top of a riser assembly 80 in a pop-up type sprinkler, as shown in FIG. 6, for example. The threads 200a of the lower nozzle housing member 200 of nozzle housing assembly 5 may be used to engage corresponding threads on a riser 80 of such a pop-up type sprinkler in a conventional manner. Nozzle housing assembly 5 also includes upper nozzle housing member 100.

Figure 1:
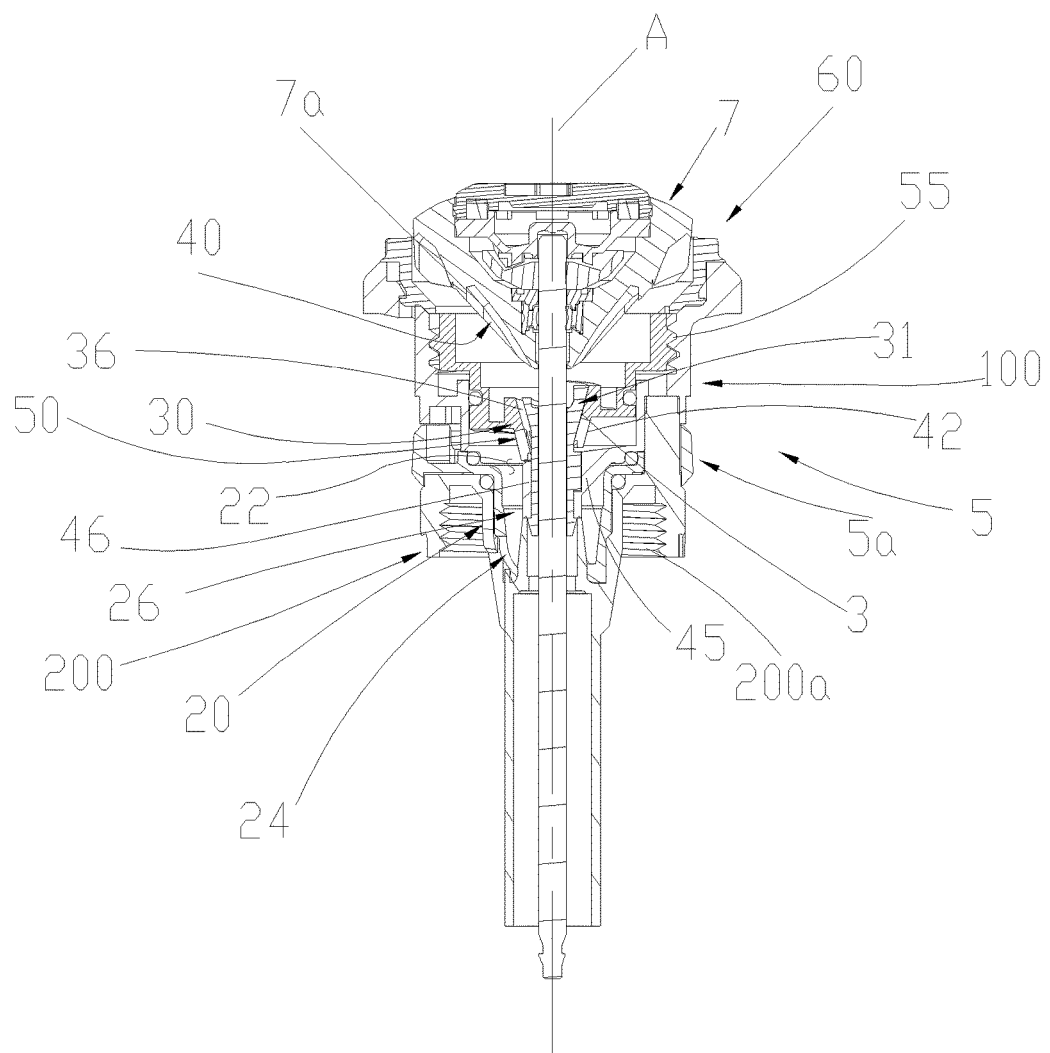
FIG. 1 shows a cross-sectional elevation view of a nozzle housing of a rotary stream sprinkler including a cone valve assembly in accordance with an embodiment of the present disclosure with the cone valve assembly open on one side and closed on the other side and the rotating distributor mounted on its shaft at its non-operating, retracted position above the adjustable arc cone valve assembly.
Figure 2:
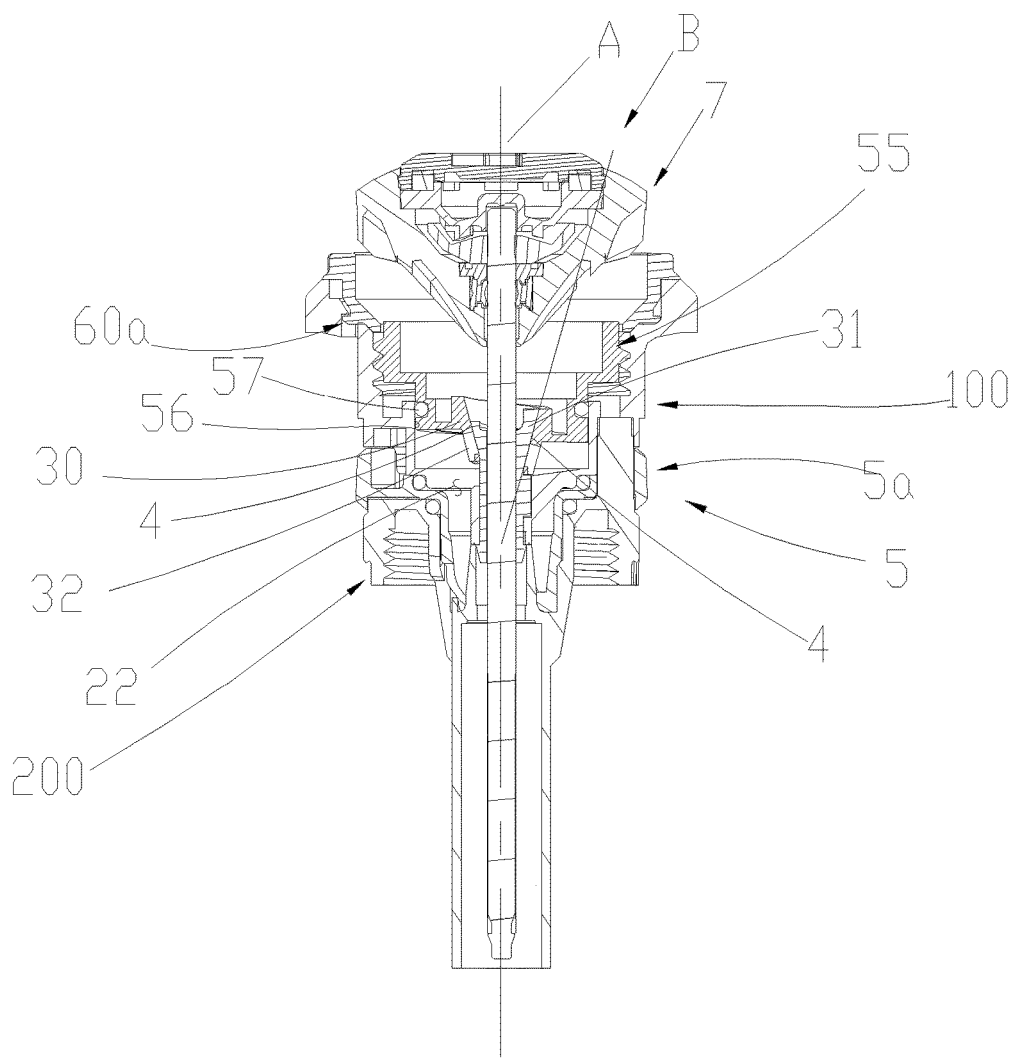
FIG. 2 shows a cross-sectional view of the nozzle housing of the rotary stream sprinkler of FIG. 1 with the arc settable stepped and spiral cone valve assembly in the fully shut off position, but with the rotating distributor positioned in its operating position in the nozzle housing so that the discharge water angle is shown where it would strike the rotating distributor including a lower valve member as illustrated in FIG. 3 described below.
Figure 2A:
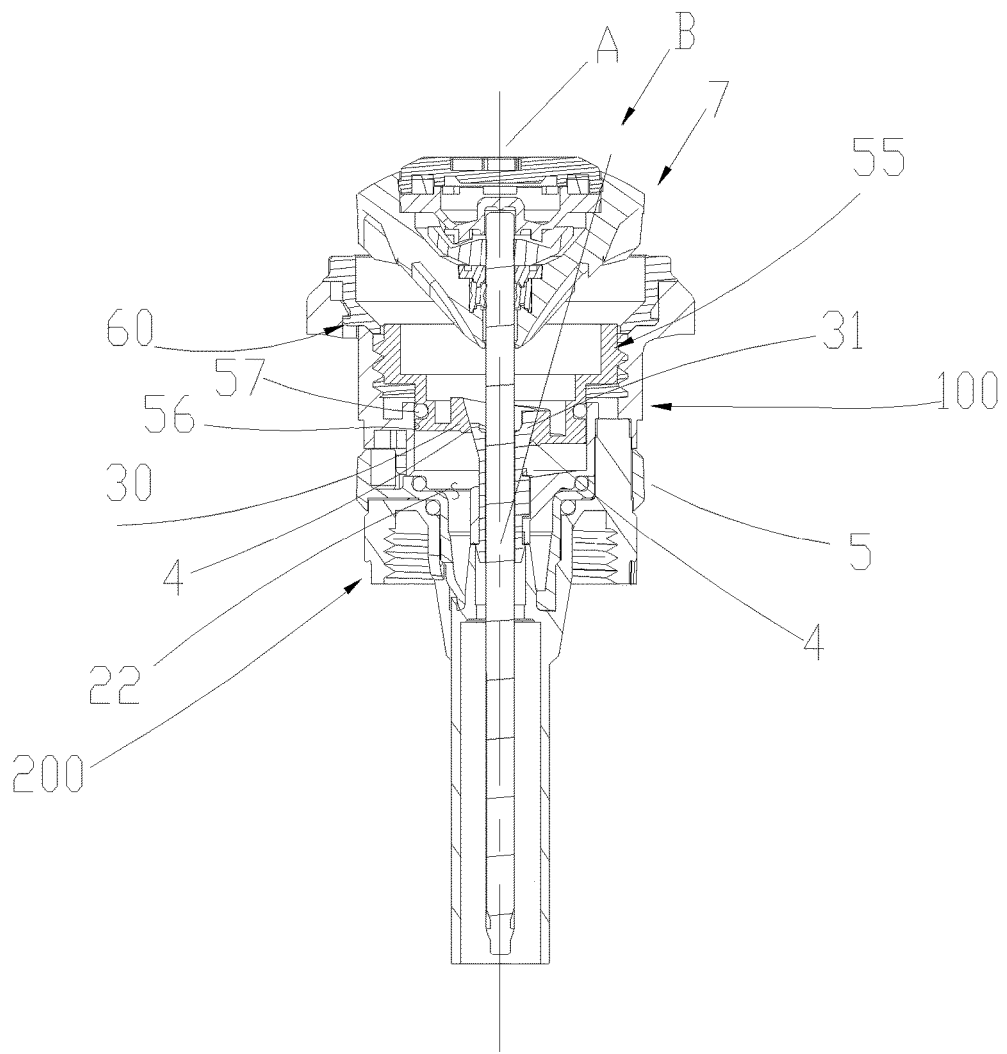
FIG. 2A shows a cross-sectional view of the nozzle housing of the rotary stream sprinkler of FIG. 1 with the arc settable stepped and spiral cone valve assembly in the fully shut off position, but with the rotating distributor positioned in its operating position in the nozzle housing so that the discharge water angle is shown where it would strike the rotating distributor including a lower valve member as illustrated in FIG. 3A described below

As can be seen in FIG. 1, for example, the cone valve assembly 3 includes upper and lower valve members 31, 30, respectively, and provides water discharge from the nozzle housing 5 at a desired angle B, relative to the central axis A of the nozzle assembly, as shown in FIG. 2, for example, such that water strikes the rotating distributor 7 at a best stream angle as desired, to provide a more efficient sprinkler. The angle B is preferably between about 11 and 17 degrees. Specifically, water flows along the conical outer and inner surfaces of the top portion of the arcuate upper valve member 31 and lower valve member 30 as indicated at 4 in FIG. 2, for example, to discharge water onto the rotating distributor 7 at the desired angle. Providing the nozzle discharge in a cone shape at a desirable angle for striking the rotating stream distributor 7 provides optimum uniformity of the sheet of water striking the distributor, and thus, avoids distortions in the output of the sprinkler.

As can be seen with reference to FIG. 1, for example, the water flow enters the central volume of the stream nozzle housing 5 via openings shown at 20. As noted above, the nozzle housing is typically mounted on the top of a riser of a pop-up sprinkler that extends from a base when water is supplied. See FIG. 6, for example. The water passes through the upstream flow-throttling member 26, specifically through the opening(s) 24 formed therein, and into an internal volume 22 just upstream of the arcuate adjustable cone nozzle assembly 3. The nozzle assembly 3 is illustrated in a closed position in FIG. 2. The flow slot passage 36 is shown open on the left side of in FIG. 1 and discharges water upwardly and outwardly at the desired or optimum angle for contacting the bottom surface 40 of the distributor 7. The distributor 7 further collects the stream of water into channels 7a of selected widths to distribute selective columns of water radially outward with selected stream channel exit elevation angles to provide the proper and uniform water distribution outwardly around the sprinkler using the nozzle assembly 3.

It is desirable that the water sheet or stream that is discharged from the valve assembly 3 have a uniform circumference, since as the rotating distributor 7 rotates, different stream channels of different widths interact with the sheet of water. Different distributions of the flow around the circumference may be achieved for selected patterns with the upstream entrance of the water at 50 by the flow reducing fingers 32 (Se FIG. 3), if desired.

Figure 4:
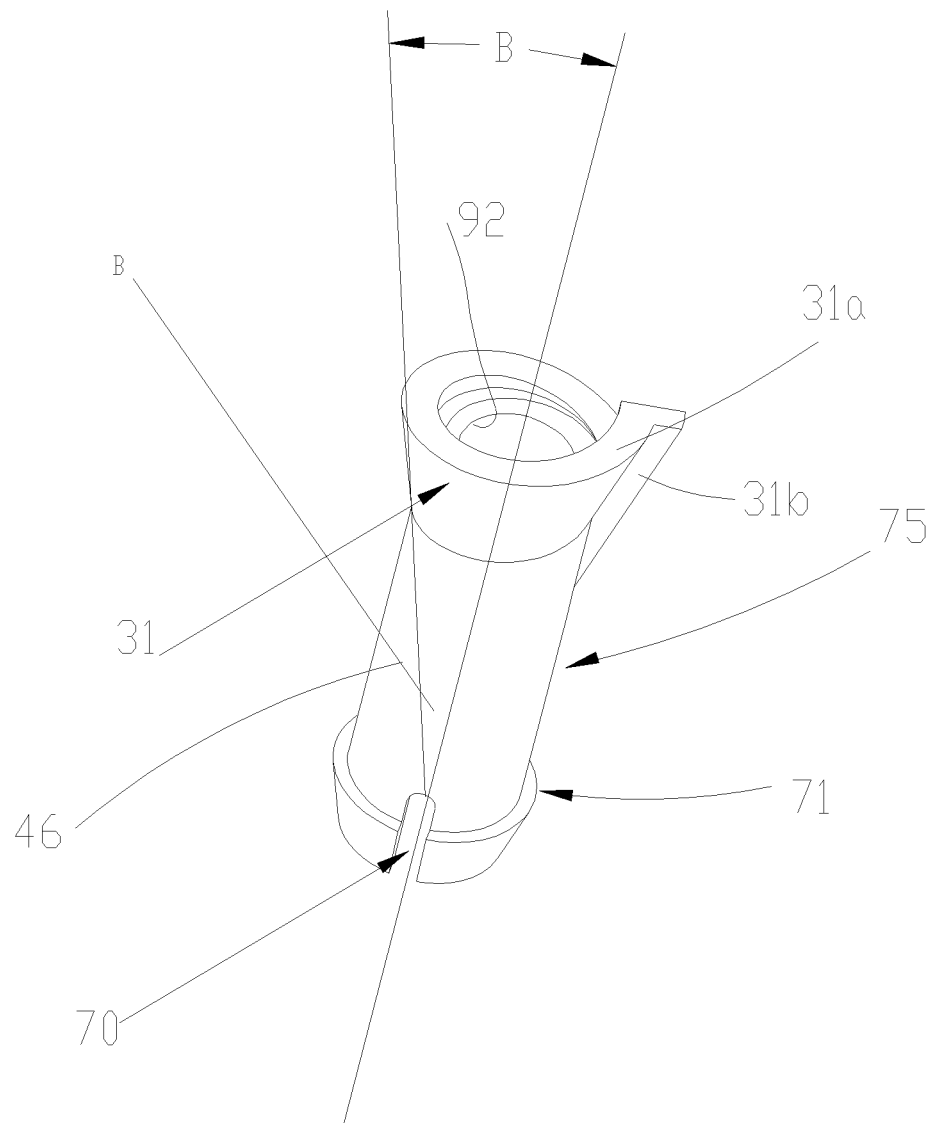
FIG. 4 shows a perspective view of the upper valve member.

The upper valve member 31 and the upper stepped and spiraled underside surface 31*a* thereof are shown in perspective in FIG. 4 as well as the surface 31*b* which becomes the fixed end of the adjustable slot 36 as the lower valve member 30 is rotatable clockwise. See FIG. 5, for example.

Figure 3:
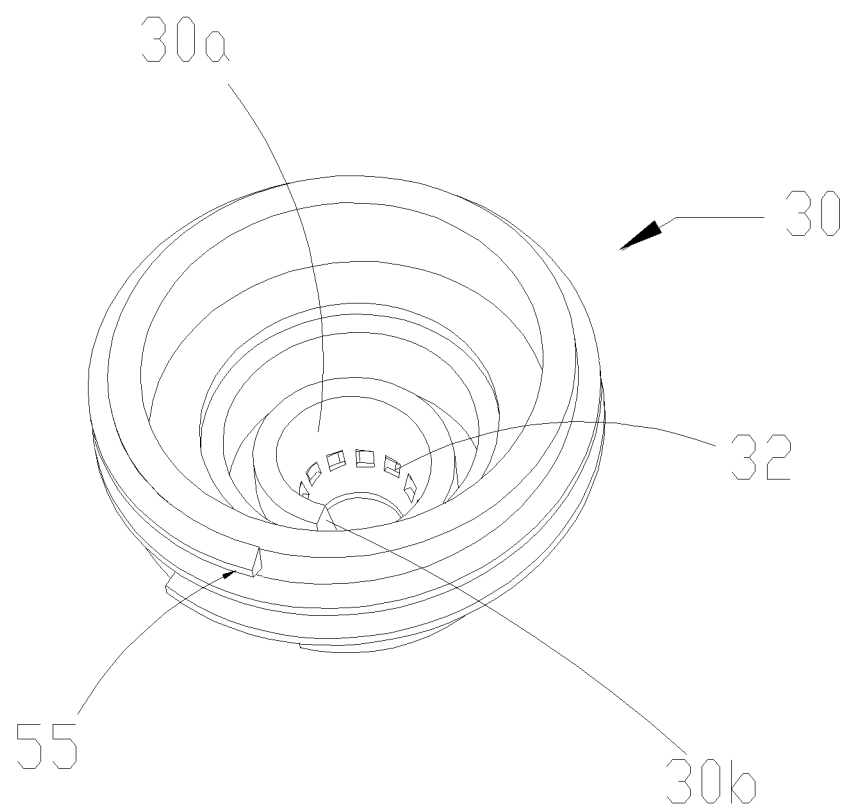
FIG. 3 shows a perspective view of the lower valve member with upstream flow restriction fingers.
Figure 3A:
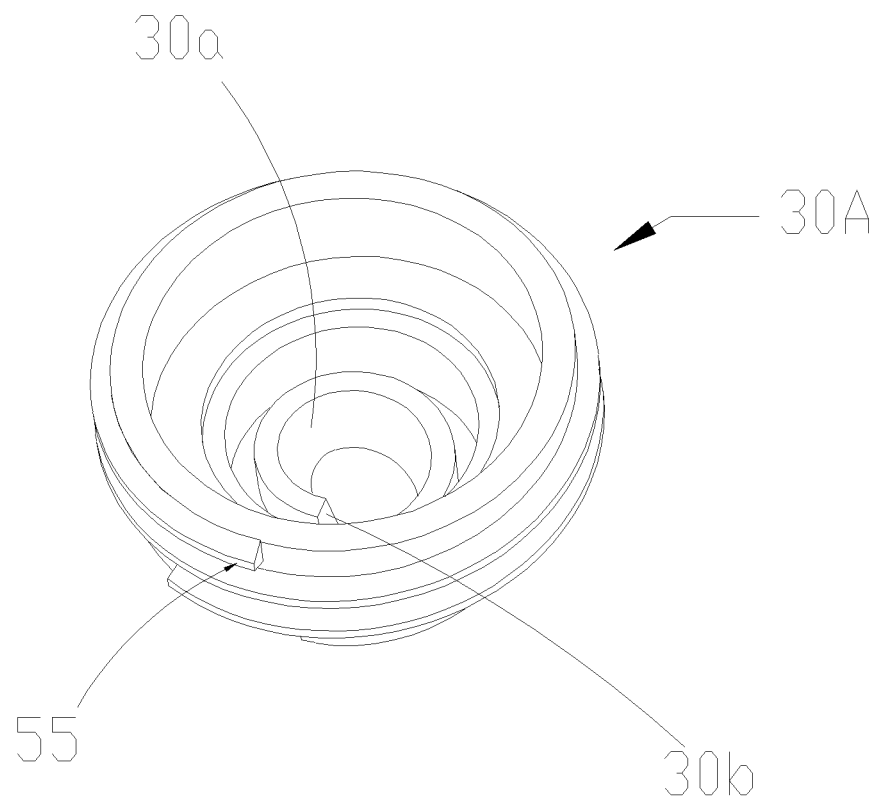
FIG. 3A shows the same perspective view of the lower valve member without the upstream flow restriction fingers.

The lower valve member 30 and the lower stepped and spiraled top valve surface 30*a* surrounding the opening O is shown in perspective in FIG. 3. The lower valve member 30 is held in proper constant axial position by the pitch of its housing thread and cylindrical seal surface 56 during sprinkler operation via mounting threads 55 and seal surface 56. The lower valve member 30 may be selectively moved axially up or down by rotation of the arc adjustment ring 60 to modify the arc of coverage of the sprinkler. Rotation of the arc adjustment ring 60 rotates the lower valve member 30 such that the threads 55 provide for axial movement of the lower valve member to exactly match the pitch of the matching upper and lower stepped and spiraled cone shaped nozzle valve surfaces.

The axial and rotational movement of the lower valve member 30 causes the circumferential nozzle slot opening 36 to be increased, or decreased, as desired to provide the desired arc of coverage. Water passes through the opening 36 to provide a sheet of nozzle discharge water that strikes the rotating distributor 7, which further directs the water radially outward for circumferential distribution around the sprinkler utilizing the nozzle assembly 3. This allows for modification of the arc of coverage of the sprinkler over any arc from 0 degrees up to 360 degrees. It is noted that generally, an arc of coverage of about 60 degrees is desirable to ensure rotation of the distributor 7.

Figure 5:
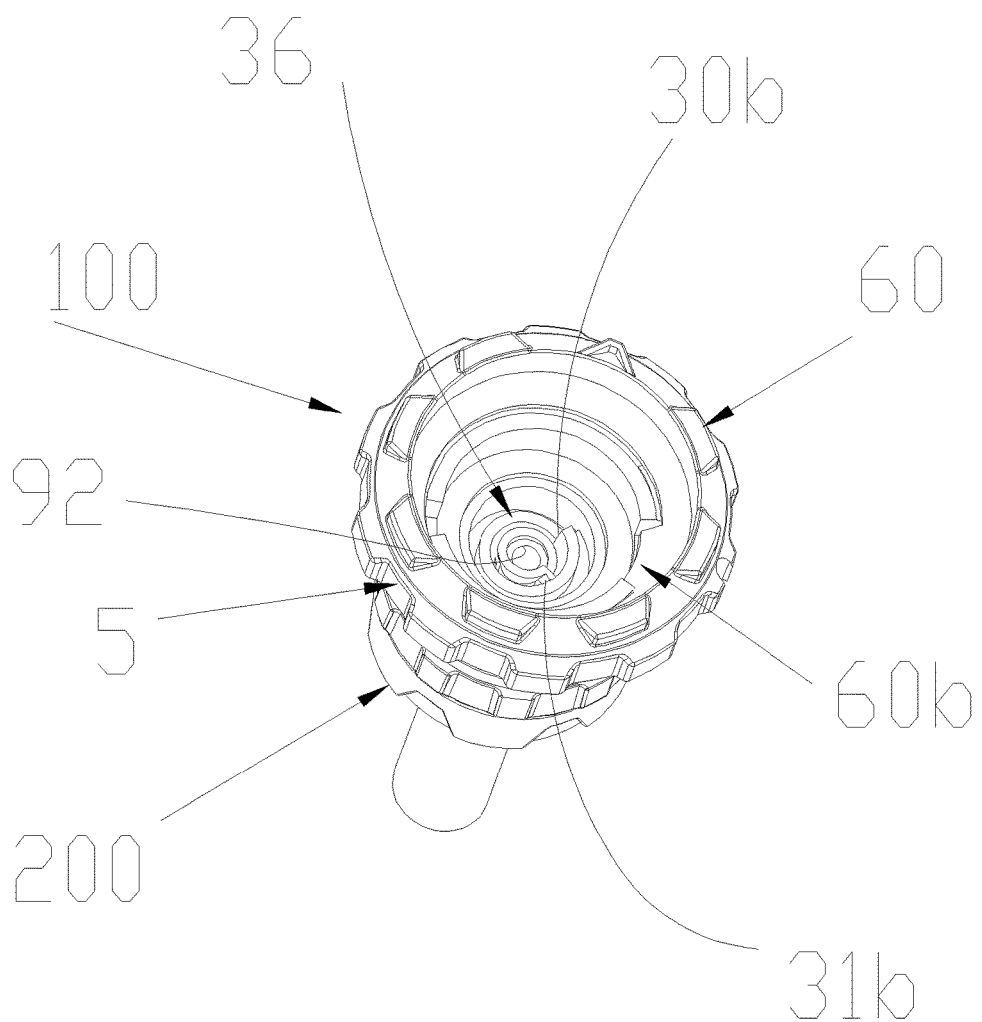
FIG. 5 illustrates a perspective view looking into the top of the cone valve assembly set at approximately 270 degrees to provide a 270 degree segment of outwardly coned cylindrical sheet of water.

The outer arc adjustment ring 60 is snapped into a grove as shown at 60*a* in FIG. 2 and rotationally connected to the lower valve member 30 via a leg as shown at 60*b* in FIG. 5, for example.

In FIG. 4, the upper valve member 31 is illustrated. The circumference break clearance slot 70 is illustrated at the bottom of support shaft 46. This slot allows the snap edge, or lip, 71 at the bottom of the upper valve member 31 to compress while being inserted into the opening O of the lower valve member 30 and to pop open at the bottom at the desired axial position in the upper nozzle housing 100, to hold the upper valve member at the desired axial position and fixed rotational position. Thus, the upper valve member 31 is fixed rotationally and axially as rotation of the lower valve member 30 is used to control the arc of coverage of the stream of water exiting the valve 3.

FIG. 5 illustrates a top view of the cone valve assembly 3 set to provide water distribution over an arc of 270 degrees. That is, as illustrated the opening 36 is provided such that the sprinkler using the cone nozzle valve assembly 3 will provide distribution of water over a 270-degree arc around the sprinkler between edge 31*b* of the upper valve member 31 and edge 30*b* of the lower valve member 30. As noted above, rotation of the lower valve member 30 causes the circumferential nozzle slot opening 36 to be increased, or decreased, as desired by the user to adjust the arc of coverage.

FIG. 6 illustrates a rotary nozzle assembly 1 complete with its pressure actuated lower piston 78 and retraction spring 79 compressed and with the rotating distributor 7 extended out of its nozzle housing 5 in its operating position. The distributor 7 includes a viscous brake assembly 91 to limit rotational speed of the distributor. The viscous brake assembly generally includes a chamber in the deflector 7 filled with a viscous fluid. The shaft 90 extends into the chamber through a seal, or seals, and a bearing, or bearings, that allows the deflector 7 to rotate relative to the shaft 90. A stator is fixedly connected to the shaft in the chamber such that the stator remains stationary while the distributor rotates to limit the speed of rotation. In a preferred embodiment, nozzle housing assembly 5 is mounted on top of riser 80 which is preferably movably mounted in a base connected to a water supply. The lower nozzle housing member 200 includes flow-throttling member 26 which may be used to limit flow through the openings 24 as discussed above. Upper nozzle housing member 100 is provided above the lower member 200 with the nozzle assembly 3, including upper and lower valve members 31, 30 mounted therein. The arc set ring 60 is mounted on top of the upper member 100 and is operably connected to the lower valve member 30 to rotate the lower valve member and move the lower valve member axially as noted above. The ring 60 is secured in a slot as indicated at 60*a*. The center clearance hole 92 in the upper valve member support shaft 46 allows the shaft 90 to pass through the valve assembly 3 to extend the distributor 7 or to allow spring 79 to retract the distributor 7 into the upper nozzle housing member 100.

Although the present invention has been described in relation to particular embodiments thereof, many other variations and modifications and other uses will become apparent to those skilled in the art.

What is claimed is:

1. A valve assembly for use in a rotary stream sprinkler comprises:
  an upper valve member including a conical top portion with a conical stepped and spiraled underside valve surface wherein water flows along the conical underside valve surface to form a conical discharge stream;
  a lower valve member including a central opening and a lower stepped and spiraled top valve surface surrounding the central opening, the upper valve member mounted in the lower valve member such that the lower valve member is movable relative to the upper valve member such that interaction between the stepped and spiraled underside valve surface of the upper valve member and the stepped and spiraled top valve surface of the lower valve member defines an adjustable arcuate slot of a desired length to provide the conical discharge stream over a desired arc of coverage when water flows through the valve assembly;
  wherein the upper valve member is mounted in the lower valve member such that the upper valve member remains in a fixed axial position and cannot rotate and the upper valve member includes a circumferential lip extending around a bottom portion of the upper valve member to prevent axial movement of the upper valve member; and
  an adjustment slot extending parallel to a central axis of the nozzle assembly at a bottom of the upper valve member such that the bottom of the upper valve element, including the circumferential locking lip resiliently deforms and extends outward when the upper valve element reaches a desired position.

2. The valve assembly of claim 1, further comprising an arc adjustment ring, operably connected to the lower valve member and rotatable about a central axis of the nozzle assembly to move the lower valve member.

3. The valve assembly of claim 2, wherein the arc adjustment ring is operably connected to the lower valve member such that the lower valve member rotates with the arc adjustment ring and moves axially, parallel to the central axis of the valve assembly, to adjust the length of the arcuate slot.

4. The valve assembly of claim 1, further comprising an upstream throttling element positioned upstream from the lower valve member and upper valve member to control flow of water to the lower and upper valve members.

5. A valve assembly for use in a rotary stream sprinkler comprises:
   an upper valve member including a conical top portion with a conical stepped and spiraled underside valve surface wherein water flows along the conical underside valve surface to form a conical discharge stream;
   a lower valve member including a central opening and a lower stepped and spiraled top valve surface surrounding the central opening, the upper valve member mounted in the lower valve member such that the lower valve member is movable relative to the upper valve member such that interaction between the stepped and spiraled underside valve surface of the upper valve member and the stepped and spiraled top valve surface of the lower valve member defines an adjustable arcuate slot of a desired length to provide the conical discharge stream over a desired arc of coverage when water flows through the valve assembly;
   wherein the conical top portion of the stepped and spiraled underside valve surface of the upper valve member extends at a desired angle relative to a central axis of the valve assembly to direct water at the desired angle and wherein the desired angle is between 11 and 17 degrees.

* * * * *